US012388784B1

(12) United States Patent
Kim et al.

(10) Patent No.: US 12,388,784 B1
(45) Date of Patent: Aug. 12, 2025

(54) VISUALIZATION OF NETWORK ADDRESS SPACE

(71) Applicant: Amazon Technologies, Inc., Seattle, WA (US)

(72) Inventors: Simon Young-min Kim, Fairfax, VA (US); Shovan Kumar Das, Medina, WA (US); Geoffrey McCarthy, Fort Myers, FL (US); Patrick Charles Mahon, Gaithersburg, MD (US); James Alexander Gray, Cape Town (ZA); Quintin Parker Davis, Alexandria, VA (US); Julien Mathieu Patry, Northville, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/475,893

(22) Filed: Sep. 27, 2023

(51) Int. Cl.
*H04L 61/5061* (2022.01)
*H04L 101/668* (2022.01)

(52) U.S. Cl.
CPC .... *H04L 61/5061* (2022.05); *H04L 2101/668* (2022.05)

(58) Field of Classification Search
CPC ................. H04L 61/5061; H04L 2101/668
See application file for complete search history.

(56) References Cited

U.S. PATENT DOCUMENTS

| | | | | |
|---|---|---|---|---|
| 8,862,725 B1* | 10/2014 | Voltmer | ............. | H04L 61/5007 709/224 |
| 9,680,858 B1* | 6/2017 | Boyer | .................... | G06Q 50/01 |
| 2009/0254833 A1* | 10/2009 | McLaughlin | ........... | H04L 41/22 715/737 |
| 2009/0313537 A1* | 12/2009 | Fu | .......................... | G06F 16/00 715/201 |
| 2021/0142760 A1* | 5/2021 | Kim | ....................... | G09G 5/005 |

* cited by examiner

*Primary Examiner* — Andrew C Georgandellis
(74) *Attorney, Agent, or Firm* — Perilla Knox & Hildebrandt LLP; Thomas B. Hildebrandt

(57) ABSTRACT

Disclosed are various embodiments for visualization of network address space. In one embodiment, a network address block assigned to an entity in a network addressing scheme is determined. A user interface is generated that visually represents the network addressing scheme with a plurality of rows. Individual rows represent divisions of a corresponding network prefix length in the network addressing scheme. The user interface indicates a location of the network address block.

20 Claims, 7 Drawing Sheets

VISUALIZATION OF NETWORK ADDRESS SPACE

BACKGROUND

Network addresses for the Internet are specified in respective addressing schemes for Internet Protocol version 4 (IPv4) and Internet Protocol version 6 (IPv6). IPv4 addresses are 32 bits in length and are usually visually represented by dotted quad notation, with four octets, each ranging from 0 to 255 and separated by periods. There are roughly $2^{32}$ or 4,294,967,296 addresses, less reserved and/or system address ranges. The use of Classless Inter-Domain Routing (CIDR) allowed for allocation of addresses using variable length subnet masks and accompanying arbitrary length network prefixes. For example, a network "192.168.1.0/24" indicates a network prefix 24 bits in length using CIDR notation, with the equivalent subnet mask of "255.255.255.0" being implied by the "/24" CIDR notation. While four billion addresses may seem like a large number, every top-level block of IPv4 addresses has already been allocated. Because of IPv4 address exhaustion, the Internet is transitioning to the use of IPv6, which uses 128-bit addresses and $2^{128}$ possible addresses. IPv6 addresses are represented as eight groupings of four hexadecimal digits, each ranging from 0000 to ffff, and separated by colons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
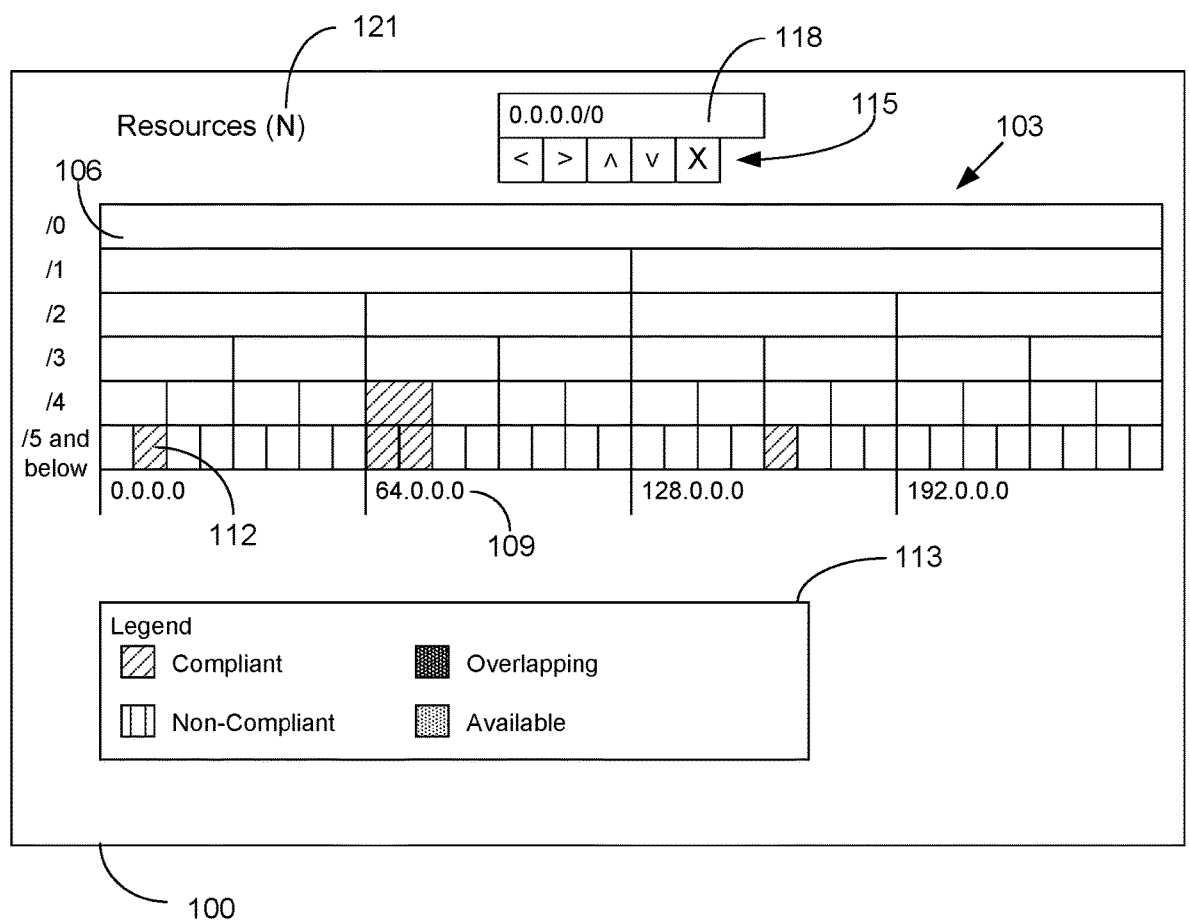
FIGS. 1A-1C are drawings of example user interfaces for visualizing network address space according to various embodiments of the present disclosure.

The present disclosure relates to visualization of network address space. Organizations that manage networking infrastructure may need to keep track of network address allocations in order to know what address ranges are already allocated, or conversely, are unallocated and available for allocation. In various scenarios, a customer may be seeking a new network address allocation with at least a certain number of network addresses to configure a subnetwork in a cloud provider network, where the addresses are allocated from a pool of available addresses from the cloud provider or from a pool of addresses that the customer already controls. Using CIDR notation, the "/X" number of bits subtracted from the number of bits in the address yields the number of addresses available in a network according to the formula 2 (32-X) for IPv4 or 2 (128-X) for IPv6. For example, a request for a "/28" network allocation in IPv4 would be for 2 (32-28) or 16 contiguous addresses.

Customer resources or hosts on a cloud provider network are assigned network addresses (IPv4 and/or IPv6) in order to communicate with one another and with other resources or hosts on the cloud provider network. For example, when a customer creates a first virtual private cloud (VPC) network, a first allocation of network addresses may be randomly allocated. When the customer subsequently creates a second VPC network, a second allocation of network addresses may be randomly allocated. These random allocations prevent customers from pre-planning their network address numbering. The first and second allocations may be non-contiguous, which may pose problems and interfere with unified management of hosts on the first and second allocations. For example, non-contiguous network address allocations would force customers to create individual static routes, security groups, access control lists, and firewalls for each function in their respective table.

It is also important to avoid unnecessary fragmentation of larger network address blocks to preserve them for customers who may require such larger allocations. To illustrate, within a "/30" block of four contiguous addresses in IPv4 are two "/31" blocks of two contiguous addresses each. Allocating a single address from the first "/31" block and a single address from the second "/31" block would make it impossible to allocate an entire "/31" block of two addresses. Thus, an allocation management system should seek to allocate both single addresses (each considered "/32" blocks) within one "/31" block, thus preserving the entire remaining "/31" block for a possible future allocation request of two contiguous addresses.

It may be difficult for individuals who manage networking infrastructure to understand how their network address space is used. Seeing a list of network address allocations in CIDR notation does not immediately indicate which allocations are contiguous or overlap. Also, due to multiple individuals potentially requesting network address allocations in an organization, various network address allocations may be deemed non-compliant for failing to comply with established rules. In one example, a subnet used in a first region may be deemed non-compliant if the subnet is within a larger network address block for a VPC network in a second region. In another example, a network address allocation for a "/24" block may be non-compliant if a rule specifies a requirement to use "/28" blocks.

Various embodiments of the present disclosure introduce graphical user interfaces that facilitate visualization of network address space. The interfaces may show a decomposition of an entire network address space in an addressing scheme, such as from "0.0.0.0" to "255.255.255.255" in the case of IPv4. Users may drill down into the graphical user interface to see smaller network address blocks. For example, users may manipulate the graphical user interface to visualize block sizes from "/1" to "/32." Color coding and/or other indicia may indicate to users whether address space is available, allocated, assigned to a pool, compliant, non-compliant, public, private, or other statuses. This visualization enables users to manage their network address space in a more efficient manner, with fewer non-compliant allocations and greater contiguity. Through the stacked CIDR visualization, block grouping, colorization, popover details, and navigation methods, a customer can freely browse the entire IPv4 and IPv6 ranges, comprehend the overview as well as down to the details, and develop a mental model of their CIDR block landscape fast and easily.

As one skilled in the art will appreciate in light of this disclosure, certain embodiments may be capable of achieving certain advantages, including some or all of the following: (1) improving the functioning of computer systems by enabling administrative users to perceive their organization's network address space visually; (2) improving the functioning of computer networks by enabling improved network address allocations that comply with various rules and more efficiently divide the address space; (3) improving the functioning of computer networks by preventing network address space exhaustion due to suboptimal allocations and fragmentation; and so forth.

With reference to FIG. 1A, shown is one example of a user interface 100 for visualization of network address space according to one or more embodiments. The user interface 100 includes a table 103 or grid that represents a particular network addressing scheme, such as IPv4 or IPv6. In other examples, the visualization of the table 103 may be in the form of a binary tree or another corresponding visualization.

The table 103 includes a plurality of rows 106, where each row 106 corresponds to a particular network prefix length in the network addressing scheme. Each row 106 is visually divided into one or more network address blocks. In this example, each row 106 is labeled with the corresponding CIDR notation or size, and each division of the row 106 corresponds to a division of the network addressing scheme into a CIDR block of that size. In some cases, the row 106 may be additionally labeled with a quantity of network addresses that are in a network corresponding to a CIDR block of the particular size.

In this example, the top row 106 is "/0," or a zero network prefix length, the second row 106 is "/1," or a single-bit network prefix length (of which there are two ($2^1$) blocks in the network addressing scheme), the third row 106 is "/2," or a two-bit network prefix length (of which there are four ($2^2$) blocks in the network addressing scheme), the fourth row 106 is "/3," or a three-bit network prefix length (of which there are eight blocks ($2^3$) in the network addressing scheme), and so on, until the sixth row 106. Although the quantity of rows 106 in this example is six, a different number of rows 106 may be included in the table 103 in other examples. In some cases, the quantity of rows 106, and the number of divisions shown in each row 106, may depend at least in part on the display area for the user interface 100. Also, in other examples, the rows 106 may have different network prefix lengths than those depicted.

The table 103 may have legend labels 109 with corresponding reference addresses. In this example, four legend labels 109 are shown, "0.0.0.0," "64.0.0.0," "128.0.0.0," and "192.0.0.0," corresponding to the starting address of the CIDR blocks aligned to the left of the legend label 109. In other examples, a different quantity of legend labels 109 may be shown, and they may be aligned to different CIDR blocks.

The locations 112 of one or more network address blocks assigned to an entity such as a customer of a cloud provider network may be indicated in the table 103. In this example, the indicated location 112 corresponds to the CIDR block "10.0.0.0/16." The locations 112 may be color coded, shaded, or marked with an indicium (e.g., a shape) that indicates a status of the corresponding network address block. For example, such statuses may include overlapping, compliant, non-compliant, unmanaged, managed, ignored, public, private, and so on. In some examples, a legend 113 explaining the relationship between the color/indicium and the status may be provided. In some examples, labels for the status may be displayed on the representations of the CIDR blocks themselves.

In some cases, the assigned network address block is smaller than the smallest division shown in the table 103. For example, the block may be a "/16" and the smallest division in the table 103 may be "/5." In such cases, the smallest division in the table 103 that includes the network address block (as well as other network address blocks) may be consolidated with the smaller block and marked. In some embodiments, the bottom row shown may have a fixed number of blocks, while a horizontal scroll bar or other navigational component may enable the user to access the entire visualization.

In some embodiments, hovering over or selecting a location 112 may cause additional information about the network address block to be displayed in a pop-over user interface. Such information may include an identification of the block in CIDR notation, a utilization of network addresses in the block, a region in which the block is used, and/or other information. In some embodiments, the CIDR blocks may be selectable and may be moved (e.g., click and drag) to other locations 112 in the table 103 in order to set one or more associations for the destination CIDR blocks.

Various selectable components 115 may be provided to update the table 103 to navigate within the network address space. Such selectable components 115 may correspond to links, buttons, and/or other user interface components. The selectable components 115 may enable updating the table 103 to show different rows 106 corresponding to larger CIDR blocks or smaller CIDR blocks (e.g., denoted with an up arrow or with a down arrow). The selectable components 115 may also enable moving laterally within the network address space (e.g., denoted with a left arrow or with a right arrow). In some embodiments, scroll bars may be present to facilitate navigation and/or swipe or pinch gestures may be used. In some embodiments, a scroll wheel or other input device may be used to pan or navigate in the table 103. In some embodiments, a voice command (e.g., "move left," "move down," etc.) may be used to pan or navigate in the table 103. While FIG. 1A shows the entirety of the network address space, display area constraints may limit horizontal size for showing smaller CIDR blocks, thereby limiting the table 103 to show a portion of the network address space. In this way, a user may interactively manipulate the table 103 to explore the entire network address space of the network addressing scheme.

An input component 118 may enable the user to specify a specific CIDR block (e.g., "10.0.0.0/16"), which would then cause the table 103 to be updated to be at the level ("/16") and the range ("10.0.0.0") to show the CIDR block at a location 112. Selecting the location 112 may provide additional information about the CIDR block and/or may cause the table 103 to be updated with a more specific location of the CIDR block (e.g., at the level of the CIDR block in terms of network prefix length). The input component 118 may also be populated with the current top most CIDR block.

In addition to showing the locations 112 of network address blocks in a network addressing scheme, the user interface 100 may also show information about usage of the network addresses within a cloud provider network. For example, the user interface may show a quantity 121 of resources. Such resources may correspond, for example, to individual virtual private cloud networks associated with a customer.

Figure 1B:
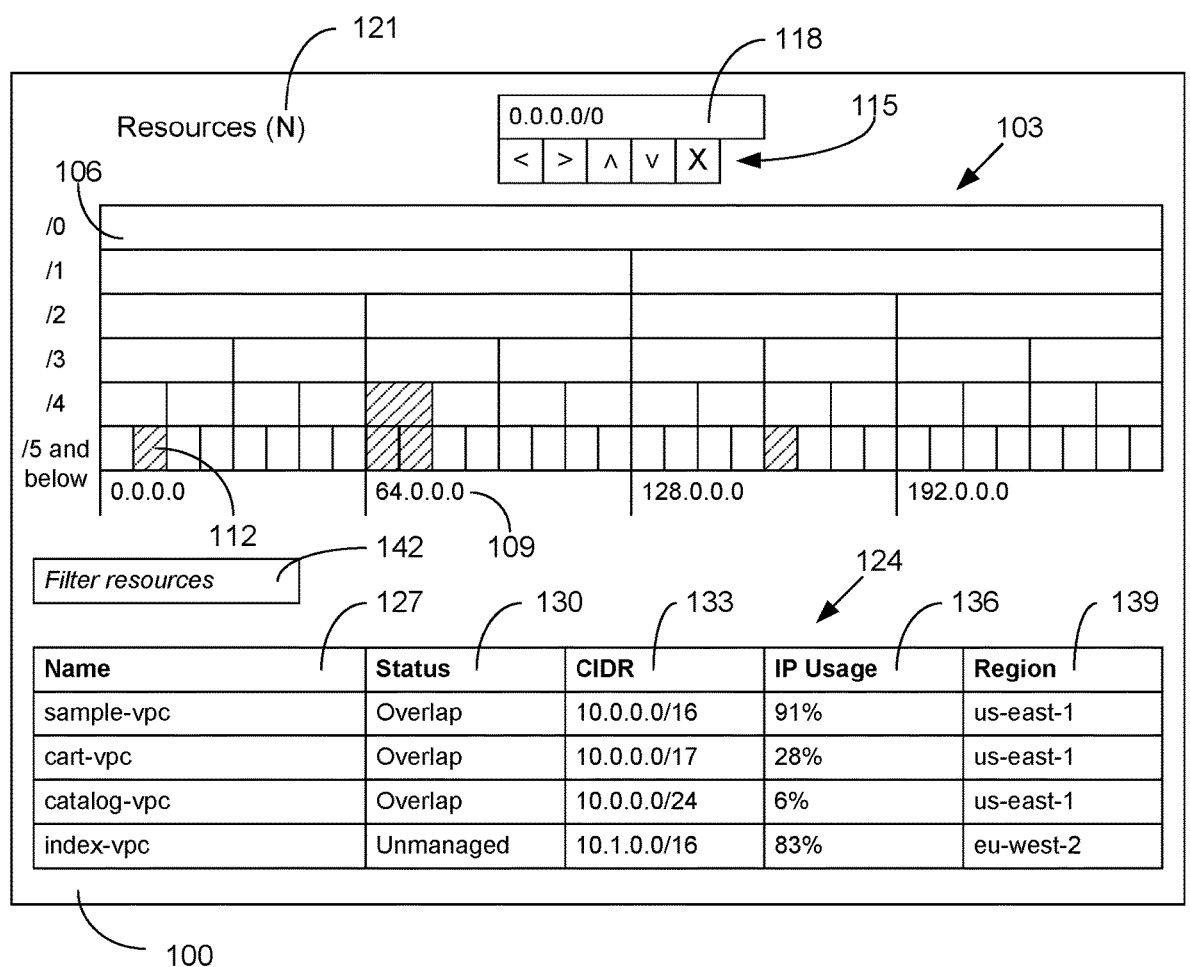

With reference to FIG. 1B, shown is one example of the user interface 100 of FIG. 1A with additional information according to one or more embodiments. The user interface 100 may also include a table 124 listing information about each of the resources. In this example, for each resource, the table 124 may include a respective name 127, a respective status 130, a respective network address block 133, a respective utilization 136 of network addresses within the block, and a respective region 139 in which the block is used. In other examples, the table 124 may include resource unique identifiers, gateways, scopes, accounts, and/or other information. In other examples, navigational components may be provided to scroll to or otherwise access other portions of the table 124. An input component 142 may be employed by a user to enter a search query or criterion to filter the table 124. In some embodiments, a selection of a CIDR block in the table 103 may result in a row in the table 124 corresponding to the CIDR block being selected.

Figure 1C:
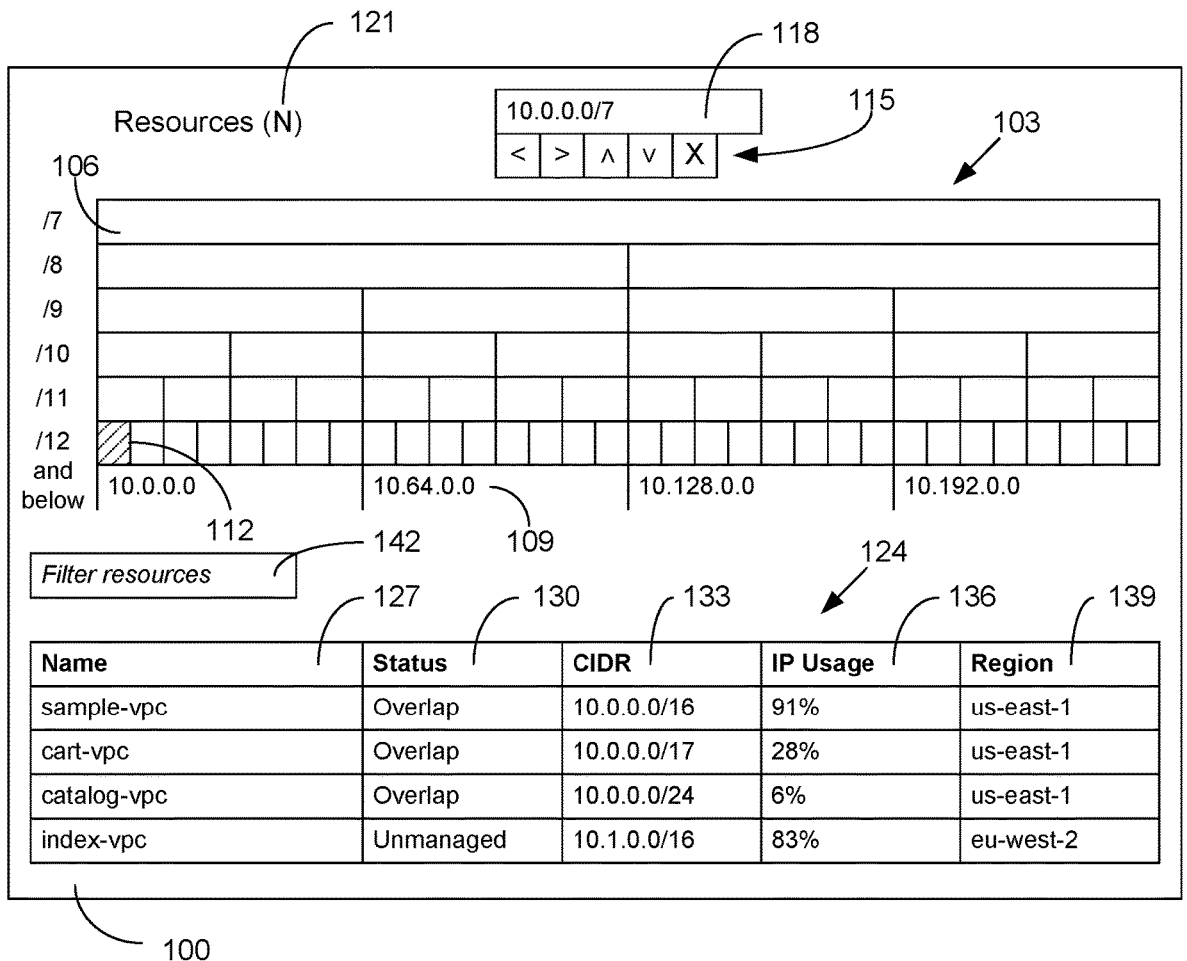

With reference to FIG. 1C, shown is one example of an update to the user interface 100 of FIG. 1B according to one or more embodiments. In FIG. 1C, the table 103 has been updated with a different set of rows 106, from "/7" to "/12" in CIDR notation. The range of network address space shown also differs from FIG. 1B. In FIG. 1C, the network address space that is shown ranges from "10.0.0.0" to "10.255.0.0," and the labels 109 are updated accordingly. The location 112 is updated to be a more specific location 112 for the network address block "10.0.0.0/16," as compared to FIG. 1B. Alternatively, the user may cause the user interface 100 to move to a higher-level view (such as that of FIG. 1B), which shows a less specific location 112 for the network address block. Although only one network address block is indicated in FIG. 1C, in other examples, multiple network address blocks may be shown. In the following discussion, a general description of the system and its components is provided, followed by a discussion of the operation of the same.

Figure 2:
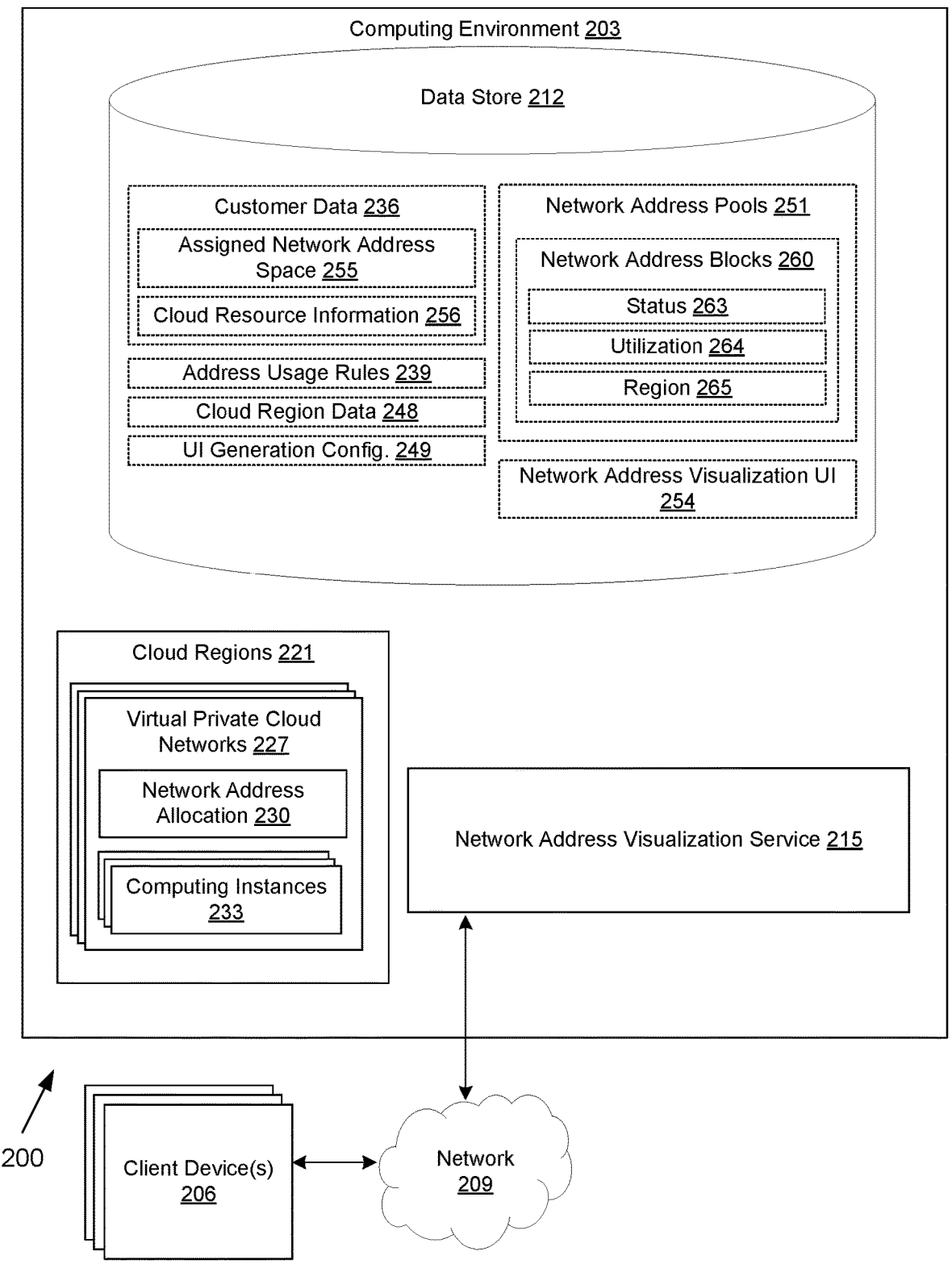
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209 The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

The computing environment 203 may implement a cloud provider network operated by a cloud provider. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

A cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

Transit Centers (TC) are the primary backbone locations linking customers to the cloud provider network and may be co-located at other network provider facilities (e.g., Internet service providers, telecommunications providers). Each region can operate two or more TCs for redundancy.

The parenting of a given edge location to an AZ or region of the cloud provider network can be based on a number of factors. One such parenting factor is data sovereignty. For example, to keep data originating from a communication network in one country within that country, the edge locations deployed within that communication network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a communication network has latency benefits, those benefits might be negated by parenting an edge location to a distant AZ or region that introduces significant latency for the edge location to region traffic. Accordingly, edge locations are often parented to nearby (in terms of network latency) AZs or regions.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components of the computing environment 203, for example, include a network address visualization service 215, one or more cloud regions 221, and other applications, services, processes, systems, engines, or functionality not discussed in detail herein. The network address visualization service 215 is executed to generate user interfaces 100 that enable users to visualize their network address space in a network addressing scheme. For example, the user may represent a customer of a cloud provider network, and one or more network address blocks may be assigned to that customer, either by the cloud provider network or by one or more regional internet registries. The user interfaces 100 generated by the network address visualization service 215 may be interactive, enabling users to drill down into the network address space to see how their network address blocks and subnets are used. The user interfaces 100 may also comprise information about cloud network resources that employ the network address blocks.

The cloud provider network may be associated with a plurality of cloud regions 221. In one embodiment, a network address allocation may span only one cloud region 221 in order to simplify routing. In other embodiments, a network address allocation may span multiple regions 221.

Virtual private cloud (VPC) networks 227 of one or more customers may be in a cloud region 221. A VPC network 227 is a custom-defined, virtual network within another network, such as a cloud provider network. A VPC network 227 can provide the foundational network layer for a cloud service, for example a compute cloud or an edge cloud, or for a customer application or workload that runs on the cloud. A VPC network 227 can be defined by at least its address space, internal structure (e.g., the computing resources that comprise the VPC network 227), and transit paths. VPC network 227 resources are typically hosted and provisioned within the cloud provider network, though customer-owned networks may be connected to the VPC network 227 through a gateway. In hosting the VPC network 227, the cloud provide network implements a logical construct using physical, and optionally virtual, resources of the cloud provider network to provision the VPC network 227.

A VPC network 227 is a virtual network dedicated to a particular customer account (or set of related customer accounts, such as different customer accounts belonging to the same business organization). A VPC network 227 is logically isolated from other virtual networks in the cloud. Customers can launch resources, such as compute instances, into a VPC network 227. When creating a VPC network 227, a customer can specify a range of IPv4 and/or IPv6 addresses for the VPC network 227 in the form of a Classless Inter-Domain Routing (CIDR) block. A VPC network 227 can span all of the availability zones in a particular region. After creating a VPC network 227, a customer can add one or more subnets in each availability zone or edge location.

A VPC network 227 may have one or more access controls. Access controls can refer to security groups or network access control lists. Security groups (also known as network security groups, application security groups, cloud security groups, or compute engine firewall rules, in various implementations) act as a virtual firewall for a virtual machine instance to control inbound and outbound traffic. Customers can define security groups as policies that can be applied to specific instances. When a customer launches an instance in a VPC network 227, they can assign one or more security groups to the instance. Security groups may act at the instance level instead of the subnet level. Therefore, each instance in a subnet can be assigned to a different set of security groups. For each security group, the customer can add rules that control the inbound traffic to instances, and a separate set of rules that control the outbound traffic. Security groups can be stateful, in that return traffic is automatically allowed.

A customer can also set up network access control lists (ACLs) with rules similar to security groups in order to add an additional layer of security to a VPC network 227. Network ACLs operate at the subnet level, support allow rules and deny rules, and automatically apply to all instances in any subnet with which it is associated. Network ACLs may not be stateful, in that return traffic must be explicitly allowed by the rules.

Each VPC network 227 may be associated with a network address allocation 230 and one or more computing instances 233. The network address allocation 230 corresponds to a block of network addresses that the customer has assigned to the particular VPC network 227. Different VPC networks 227 may be assigned different size network address allocations 230. Individual network addresses may be assigned to respective computing instances 233 of the customer, so that data traffic to the respective computing instance 233 can be correctly routed using the network address.

The data stored in the data store 212 includes, for example, customer data 236, one or more address usage rules 239, cloud region data 248, a user interface (UI) generation configuration 249, one or more network address pools 251, a network address visualization user interface (UI) 254, and potentially other data.

The customer data 236 includes data associated with one or more accounts of a customer of the cloud provider, such as an organization or another entity. The customer data 236 may include assigned network address space 255, cloud resource information 256, and/or other data. The assigned network address space 255 is assigned to the customer by another customer, the cloud provider network, or a regional internet registry. The assigned network address space 255 may include public and/or private network addresses. The cloud resource information 256 includes data about various cloud resources, such as virtual private cloud networks 227, that are controlled by the customer.

The address usage rules 239 correspond to rules that establish whether network address blocks or subnets of network address blocks are considered compliant or non-compliant. For example, an address usage rule 239 may indicate that a first network address block that overlaps a second network address block of the customer may be considered non-compliant due to the overlap. Also, if a network address block is assigned to a particular cloud region 221, an address usage rule 239 may indicate that a subset of the network address block is non-compliant if it is being used in a different cloud region 221.

The cloud region data 248 may include data describing the plurality of cloud regions 221, including the VPC networks 227 assigned to the cloud region 221, network address allocations 230 assigned to the cloud region 221, and other data.

The UI generation configuration 249 may control how the network address visualization user interfaces 254 are generated. For example, the UI generation configuration 249 may control the look-and-feel of the network address visualization user interfaces 254, including proportions, colors, sizes, graphical embellishments, UI components used, default views, navigation behavior, and so on.

The network address pools 251 are pools of network addresses that are issued by the cloud provider network from one or more root allocations to the cloud provider network. In one example, the network addresses correspond to publicly routable network addresses that are assigned to the cloud provider network. In another example, the network addresses correspond to internal network addresses that are routable only within the cloud provider network or a cloud region 221. A network address pool 251 corresponds to a particular set of network addresses that are assigned to a particular customer for use by that customer in the cloud provider network or to connect hosts to the resources of the customer in the cloud provider network.

A network address pool 251 may include one or more network address blocks 260. The network address blocks 260 correspond to ranges of network addresses within the network address pool 251 that are either allocated or free for future allocations by the customer. In one embodiment, a particular network address block 260 may be allocated to a VPC network 227, and then the network addresses of the network address block 260 may be assigned to individual hosts or computing instances 233 of the VPC network 227. Each of the network address blocks 260 may be associated with a corresponding status 263 (e.g., compliant, non-compliant, managed, unmanaged, overlapping, etc.), a corresponding utilization 264 of network addresses, and a corresponding region 265 in which the network address block 260 is assigned for use.

The network address visualization user interface 254 corresponds to the user interfaces 100 generated by the network address visualization service 215. The network address visualization user interface 254 may comprise hypertext markup language (HTML), JAVASCRIPT, cascading style sheets (CSS), extensible markup language (XML), and/or other formatting elements. In some embodiments, the network address visualization user interfaces 254 may be configured to dynamically adapt to a screen size or available display area of a client device 206. In some embodiments, the network address visualization user interface 254 may be wholly generated in the computing environment 203 and then sent to the client device 206 (e.g., as an image or a complete HTML page). In other embodiments, logic executed in the client device 206 may generate the network address visualization user interface 254 in response to parameters sent from the computing environment 203.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may comprise a display such as, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application and/or other applications. The client application may be executed in a client device 206, for example, to access network content served up by the computing environment 203 and/or other servers, thereby rendering a user interface 100 on the display. To this end, the client application may comprise, for example, a browser, a dedicated application, etc., and the user interface 100 may comprise a network page, an application screen, etc. The client device 206 may be configured to execute applications beyond the client application such as, for example, email applications, social networking applications, word processors, spreadsheets, and/or other applications.

Figure 3:
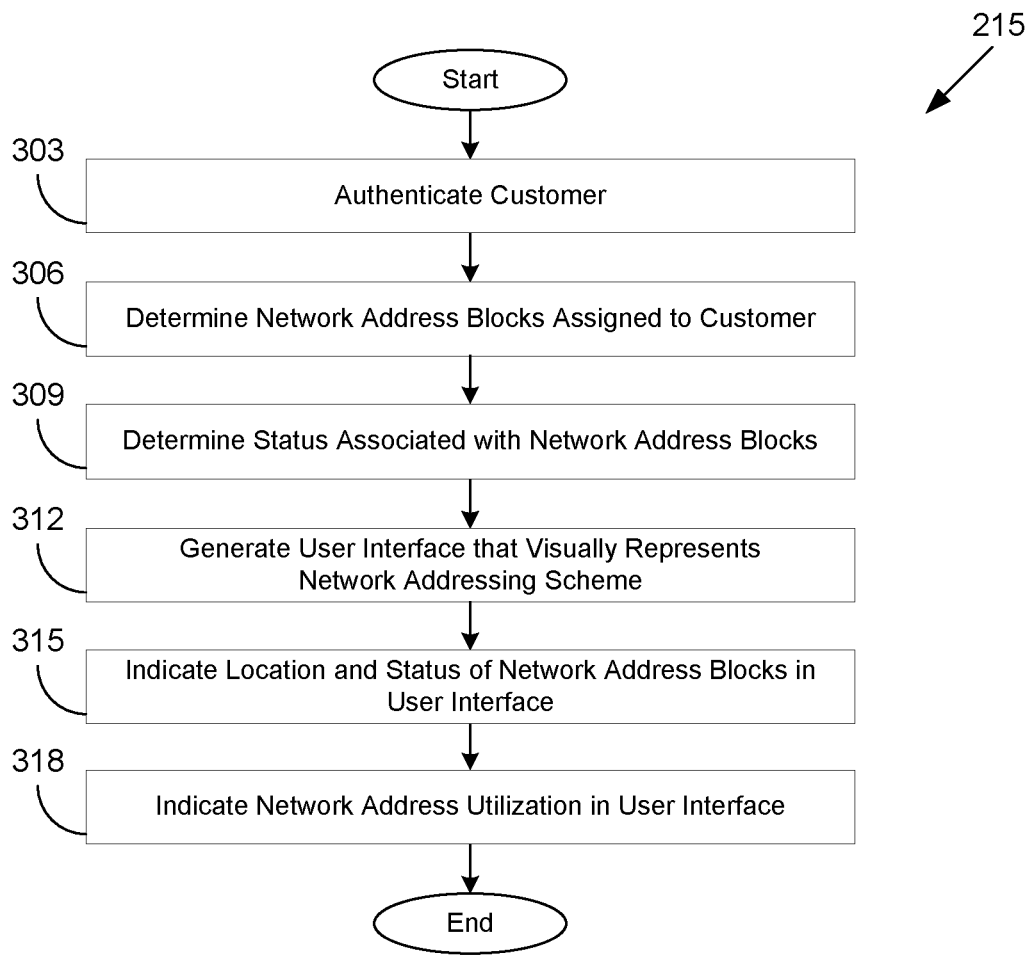
FIG. 3 is a flowchart illustrating one example of functionality implemented as portions of a network address visualization service executed in a computing environment in the networked environment of FIG. 2 according to various embodiments of the present disclosure.

Referring next to FIG. 3, shown is a flowchart that provides one example of the operation of a portion of the network address visualization service 215 according to various embodiments. It is understood that the flowchart of FIG. 3 provides merely an example of the many different types of functional arrangements that may be employed to implement the operation of the portion of the network address visualization service 215 as described herein. As an alternative, the flowchart of FIG. 3 may be viewed as depicting an example of elements of a method implemented in the computing environment 203 (FIG. 2) and/or the client device 206 (FIG. 2) according to one or more embodiments.

Beginning with box 303, the network address visualization service 215 authenticates a customer of a cloud provider network at a client device 206. For example, the customer may be required to log in using a username, password, authentication token, and/or other security credentials. Alternatively, the client device 206 may be automatically authenticated due to a long-lived registration credential, e.g., stored in cookie data presented to the network address visualization service 215.

In box 306, the network address visualization service 215 determines one or more network address blocks 260 assigned to the customer in the cloud provider network. The network address visualization service 215 may be determined from the assigned network address space 225. In another embodiment, the network address visualization service 215 may receive a list of the network address blocks 260 from another source.

In box 309, the network address visualization service 215 determines corresponding statuses 263 associated with the network address blocks 260 of the customer. Such statuses 263 may include compliant, non-compliant, free, allocated, overlapping, public, private, and/or other statuses 263. In some embodiments, the network address visualization service 215 may dynamically evaluate one or more address usage rules 239 against the network address blocks 260 of the customer in order to determine statuses 263 such as compliant or non-compliant.

In box 312, the network address visualization service 215 generates a network address visualization user interface 254 to visually represent a network addressing scheme, such as IPv4 or IPv6. The network address visualization user interface 254 includes a table 103 having a plurality of rows 106, where the individual rows 106 represent divisions of a corresponding network prefix length in the network addressing scheme. For example, a row 106 corresponding to the "/17" level may show multiple CIDR blocks corresponding to size "/17," each having $2^{(32-17)}$ or 32,768 addresses.

In some embodiments, the quantity of rows 106 and/or the quantity of divisions shown for each row 106 may be determined based at least in part on an available display area of the client device 206. In other words, how many CIDR blocks are shown may depend on the available display area, and which range of CIDR blocks may be selectable. For example, the range may be selected so as to include the location 112 of the network address block 260 of the customer. The network address visualization user interface 254 may also be resized, and upon resizing, may be dynamically updated to change the quantity of rows 106 and/or the quantity of divisions.

In box 315, the network address visualization service 215 indicates a location 112 and a corresponding status 263 of the one or more network address blocks 260 in the network address visualization user interface 254. The location 112 may be color coded or display a corresponding indicium to indicate the status 263 of the network address blocks 260. In one embodiment, the block in the table 103 may have multiple colors (e.g., in bands) to represent different concurrent statuses embodied in the corresponding network address block 260.

In box 318, the network address visualization service 215 indicates the network address utilization 264 corresponding to the network address blocks 260 in the network address visualization user interface 254. For example, the network address utilization 264 may be provided for each of a plurality of subnets corresponding to virtual private cloud networks 227 of the customer, where the virtual private cloud networks 227 are allocated at least a portion of the network address block 260 of the customer. The network address visualization user interface 254 may also indicate corresponding regions 265 for each subnet of a plurality of subnets in a network address block 260. Thereafter, the operation of the portion of the network address visualization service 215 ends.

Figure 4:
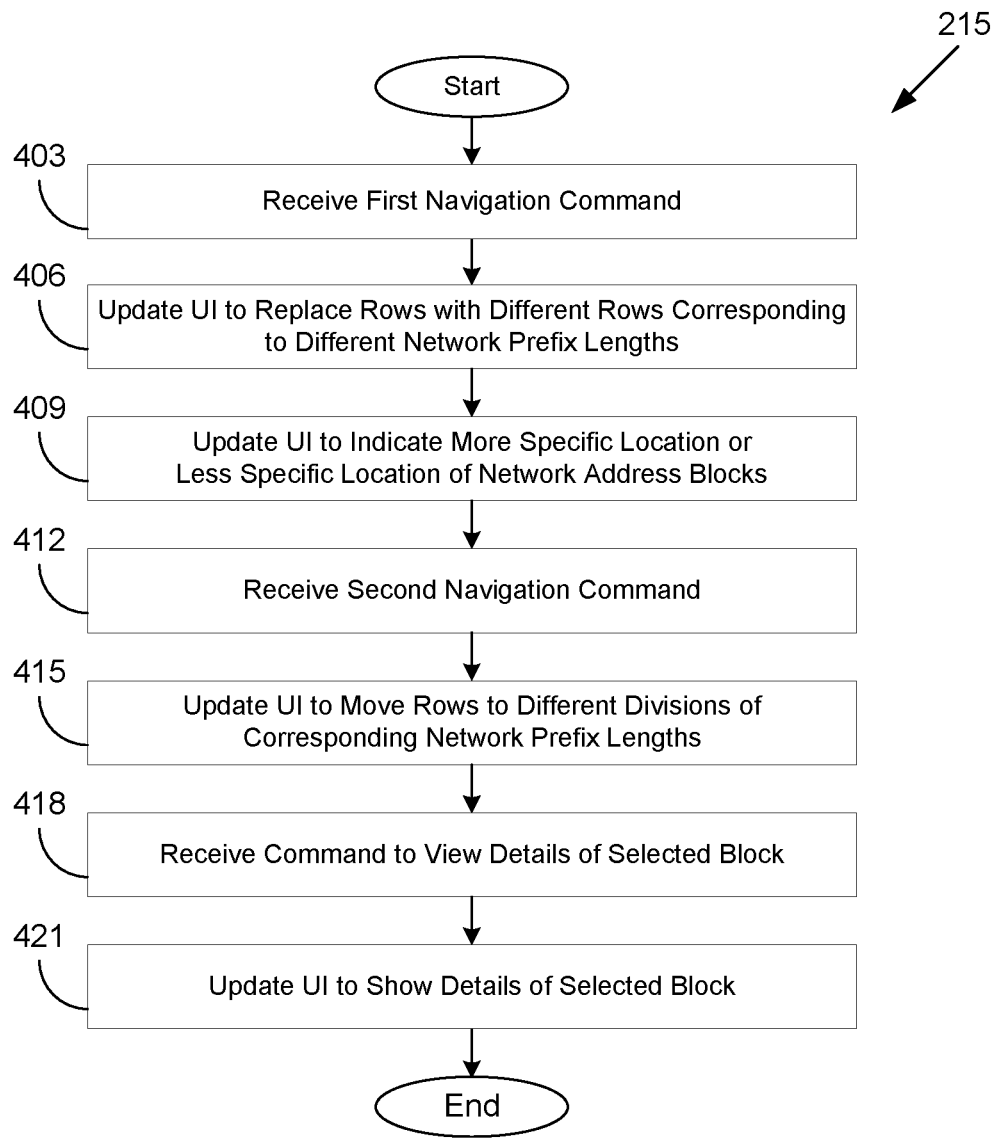
FIG. 4 is a flowchart illustrating one example of functionality implemented as portions of a network address visualization service executed in a computing environment in the networked environment of FIG. 2 according to various embodiments of the present disclosure.

Referring next to FIG. 4, shown is a flowchart that provides one example of the operation of another portion of the network address visualization service 215 according to various embodiments. It is understood that the flowchart of FIG. 4 provides merely an example of the many different types of functional arrangements that may be employed to implement the operation of the portion of the network address visualization service 215 as described herein. As an alternative, the flowchart of FIG. 4 may be viewed as depicting an example of elements of a method implemented in the computing environment 203 (FIG. 2) and/or the client device 206 (FIG. 2) according to one or more embodiments.

Beginning with box 403, the network address visualization service 215 receives a first navigation command, such as a user selection of a first UI component (e.g., a navigation component) in the network address visualization UI 254. For example, the first UI component may be an up or down button for requesting that a different set of rows 106 be displayed in the table 103. In another example, the first UI component may be a box in the table 103 corresponding to a location 112 of the particular network address block 260.

In box 406, the network address visualization service 215 updates the network address visualization UI 254 to replace the current rows 106 with different rows 106, which correspond to different network prefix lengths as compared to the current rows 106. For example, the user interface 100 of FIG. 1B may be updated to the user interface 100 of FIG. 1C. In box 409, the network address visualization service 215 may update the network address visualization UI 254 to indicate a more specific location 112 (or a less specific location 112 if moving to a higher level) of the network address blocks 260 of the customer.

In box 412, the network address visualization service 215 receives a second navigation command, such as a user selection of a second UI component (e.g., a navigation component) in the network address visualization UI 254. For example, the first UI component may be a left or right button for requesting that the rows 106 be updated to show a different set of divisions or a different range of network addresses in the network addressing scheme. In other words, selection of the component may cause the user interface to move the rows 106 to different divisions of the corresponding network prefix lengths in the network addressing scheme. In box 415, the network address visualization service 215 updates the network address visualization UI 254 to move the rows 106 to different divisions of the corresponding network prefix lengths, thereby covering a different range of the network addressing scheme.

In box 418, the network address visualization service 215 may receive a command to view details about a selected network address block 260. For example, a user may tap on, right click, double click, hover over, etc., a particular network address block 260. In box 421, the network address visualization service 215 causes the network address visualization UI 254 to be updated to show detailed information about the network address block 260. In one embodiment, this may be shown in a pop-over window. The detailed information may include the network prefix and prefix length of the network address block 260, textual explanations of any status, percentage of network addresses allocated, information about a virtual private cloud network that is assigned the network address block 260, and so forth. Thereafter, the operation of the portion of the network address visualization service 215 ends.

In some embodiments, the network address visualization UI 254 may be integrated with a network address management service, such that management functions of the network address management service may be performed by way of the network address visualization UI 254. For example, the user may select a particular network address block 260 and assign it to a network address pool 251, allocate it to a virtual private cloud network 227, split it into multiple network address blocks 260 or independently managed subnets, merge multiple network address blocks 260 that are contiguous together, and other management functions.

Figure 5:
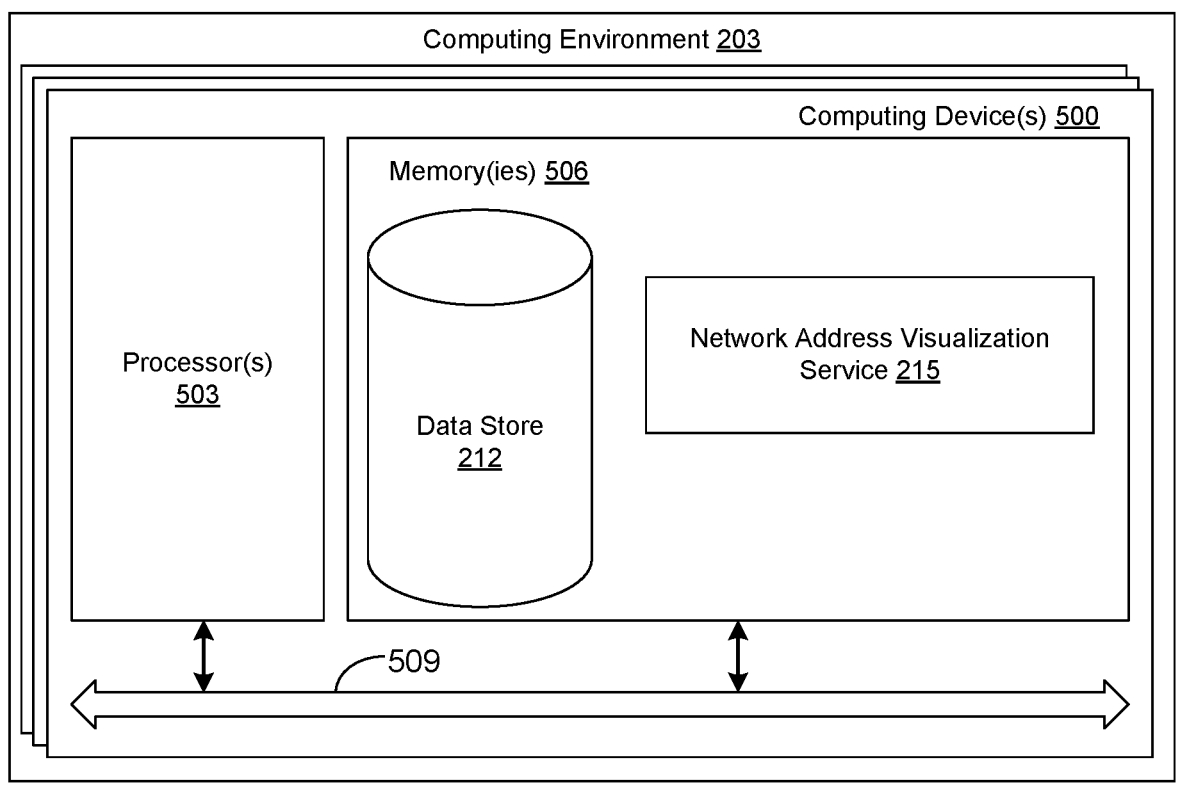
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network address visualization service 215, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although network address visualization service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the network address visualization service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network address visualization service 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network address visualization service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A system, comprising:
   a cloud provider network that hosts virtual private cloud networks on behalf of a plurality of customers; and
   at least one computing device configured to at least:
   determine a network address block assigned to a customer of the cloud provider network in a network addressing scheme;
   generate a user interface that visually represents the network addressing scheme in a table having a plurality of rows, individual rows of the plurality of rows representing divisions of a corresponding network prefix length in the network addressing scheme;
   indicate in the user interface a location of the network address block;
   indicate in the user interface a compliance status of the network address block, the compliance status indicating whether an allocation of network addresses in the network address block is compliant or non-compliant with a rule established by the cloud provider network; and
   indicate in the user interface a network address utilization of a virtual private cloud network of the customer that is allocated at least a portion of the network address block;
   wherein the location is color coded to indicate the compliance status of the network address block, and the allocation is deemed non-compliant in response to the allocation being into a first region of the cloud provider network that differs from a second region of the cloud provider network that is associated with the network address block.

2. The system of claim 1, wherein the at least one computing device is further configured to at least:
   receive a user selection of the location of the network address block;
   update the user interface to show a different row having divisions of a different network prefix length; and
   indicate a more specific location of the network address block in the different row.

3. The system of claim 1, wherein the location is further color coded to indicate whether the network address block includes an overlap of another network address block.

4. The system of claim 1, wherein the cloud provider network comprises a plurality of regions, and the user interface indicates a corresponding region of the plurality of regions for individual subnets of a plurality of subnets in the network address block.

5. The system of claim 1, wherein at least one of: a quantity of rows or a quantity of divisions shown in the user interface is determined based at least in part on an available display area for the user interface on a client device.

6. The system of claim 1, wherein the user interface includes a first set of rows as the plurality of rows, and the user interface includes selectable components that in response to selection cause the user interface to replace the first set of rows with a second set of rows representing a different set of network prefix lengths in the network addressing scheme.

7. The system of claim 1, wherein the user interface includes selectable components that in response to selection cause the user interface to move the plurality of rows to different divisions of the corresponding network prefix lengths in the network addressing scheme.

8. A computer-implemented method, comprising:
   hosting, by a cloud provider network, virtual private cloud networks on behalf of a plurality of entities;
   determining a network address block assigned to an entity in a network addressing scheme;
   generating a user interface that visually represents the network addressing scheme in a table with a plurality of rows, individual rows of the plurality of rows representing divisions of a corresponding network prefix length in the network addressing scheme;
   indicating a location of the network address block in the user interface;
   indicating in the user interface a compliance status of the network address block, the compliance status indicating whether an allocation of network addresses in the network address block is compliant or non-compliant with a rule established by the cloud provider network; and
   indicating in the user interface a network address utilization of a virtual private cloud network of the entity that is allocated at least a portion of the network address block;
   wherein the location is color coded to indicate the compliance status of the network address block, and the allocation is deemed non-compliant in response to the allocation being into a first region of the cloud provider network that differs from a second region of the cloud provider network that is associated with the network address block.

9. The computer-implemented method of claim 8, wherein the allocation is deemed non-compliant further in response to the rule requiring a different allocation size than the allocation.

10. The computer-implemented method of claim 8, further comprising indicating respective locations of a plurality of subdivisions of the network address block in the user interface.

11. The computer-implemented method of claim 10, further comprising indicating respective statuses of the plurality of subdivisions of the network address block using a corresponding color or a corresponding indicium.

12. The computer-implemented method of claim 8, further comprising updating the user interface to show a different row having divisions of a different network prefix length.

13. The computer-implemented method of claim 8, further comprising:
   receiving a user selection of the location of the network address block;
   updating the user interface to show a different row having divisions of a different network prefix length; and
   indicating a more specific location of the network address block in the different row.

14. A computer-implemented method, comprising:
   generating a user interface that visually represents a network addressing scheme in a table having a plurality of rows, individual rows of the plurality of rows representing divisions of a corresponding network prefix length in the network addressing scheme;
   receiving a navigation command;
   updating the user interface to show a different set of rows corresponding to different network prefix lengths in the network addressing scheme;
   indicating a location of each of a plurality of network address blocks represented in the user interface;

indicating in the user interface a compliance status for each of the plurality of network address blocks represented in the user interface, the compliance status indicating whether a network address block includes an allocation of network addresses that is compliant or non-compliant with a rule established by a cloud provider network; and indicating, for each network address block represented in the user interface, a network address utilization of the network addresses in the network address block;

wherein the location of each of the plurality of network address blocks represented in the user interface is color coded to indicate the compliance status of the network address block, and the allocation is deemed non-compliant in response to the allocation being into a first region of the cloud provider network that differs from a second region of the cloud provider network that is associated with the network address block in which the allocation is included.

15. The computer-implemented method of claim 14, wherein the user interface comprises a legend indicating indicia or colors corresponding to a plurality of statuses of network address blocks represented in the user interface.

16. The computer-implemented method of claim 14, wherein receiving the navigation command further comprises receiving a user selection of a navigation component in the user interface.

17. The computer-implemented method of claim 14, further comprising determining a quantity of rows shown in the user interface based at least in part on an available display area.

18. The computer-implemented method of claim 14, further comprising:

receiving a different navigation command; and updating the user interface so that a different set of divisions for the corresponding network prefix lengths are shown in respective rows of the user interface.

19. The computer-implemented method of claim 14, wherein the allocation is deemed non-compliant further in response to the rule requiring a different allocation size than the allocation.

20. The computer-implemented method of claim 14, wherein the location is further color coded to indicate whether the network address block includes an overlap of another network address block.

* * * * *